(12) United States Patent
Kamalski

(10) Patent No.: US 8,527,194 B2
(45) Date of Patent: Sep. 3, 2013

(54) PORTABLE NAVIGATION DEVICE, PORTABLE ELECTRONIC COMMUNICATIONS APPARATUS, AND METHOD OF GENERATING RADIO DATA SYSTEM INFORMATION THEREFOR

(76) Inventor: Theo Kamalski, Weert (NL)

(*) Notice: Subject to any disclaimer, the term of this patent is extended or adjusted under 35 U.S.C. 154(b) by 405 days.

(21) Appl. No.: 12/736,401

(22) PCT Filed: May 29, 2008

(86) PCT No.: PCT/EP2008/004607
§ 371 (c)(1),
(2), (4) Date: Oct. 5, 2010

(87) PCT Pub. No.: WO2009/143874
PCT Pub. Date: Dec. 3, 2009

(65) Prior Publication Data
US 2011/0029237 A1 Feb. 3, 2011

(51) Int. Cl.
*G01C 21/30* (2006.01)
(52) U.S. Cl.
USPC .......................................................... 701/408
(58) Field of Classification Search
USPC .......................................................... 701/208
See application file for complete search history.

(56) References Cited

U.S. PATENT DOCUMENTS

| 7,974,777 | B2* | 7/2011 | Deurwaarder et al. | 701/412 |
| 2006/0174268 | A1* | 8/2006 | Matero | 725/39 |
| 2008/0077323 | A1 | 3/2008 | Boysen | |
| 2008/0160928 | A1* | 7/2008 | Tsfaty et al. | 455/77 |
| 2008/0221782 | A1* | 9/2008 | Deurwaarder et al. | 701/117 |
| 2009/0143035 | A1* | 6/2009 | Jaisimha et al. | 455/161.3 |

FOREIGN PATENT DOCUMENTS

| DE | 196 26 391 | 7/1997 |
| DE | 100 11 259 | 9/2001 |
| EP | 0 982 885 | 3/2000 |
| EP | 1 515 466 | 3/2005 |
| GB | 2 414 122 | 11/2005 |

OTHER PUBLICATIONS

International Preliminary Report on Patentability dated Nov. 30, 2010.

* cited by examiner

*Primary Examiner* — Hussein A. Elchanti

(57) ABSTRACT

A portable navigation device includes a processing resource operably coupled to a Radio Data System communications unit and a location determination unit. In at least one embodiment, the processing resource supports a country code selector and is operably coupled to a data store capable of storing Radio Data System country code data. In at least one embodiment, the processing resource is also arranged to determine a first country associated with location data generated, when in use, by the location determination unit, the country code selector being arranged to identify a first country code from the country code data that does not correspond to the first country associated with the location data and a second country neighboring the first country. The processing resource is also arranged to use the first country code to generate a Program Identification code.

25 Claims, 10 Drawing Sheets

US 8,527,194 B2

PORTABLE NAVIGATION DEVICE, PORTABLE ELECTRONIC COMMUNICATIONS APPARATUS, AND METHOD OF GENERATING RADIO DATA SYSTEM INFORMATION THEREFOR

FIELD OF THE INVENTION

The present invention relates to a portable navigation device of the type that, for example, is capable of transmitting a frequency modulated signal. The present invention also relates to a method of generating Radio Data System information in respect of a portable navigation device, the method being of the type that, for example, is useable in relation to transmission of a frequency modulated signal. The present invention also relates to a portable electronic apparatus of the type that, for example, is capable of generating an audio signal for transmission as a frequency modulated signal. The present invention further relates to a method of generating Radio Data System information in respect of a portable electronic communications apparatus, the method being of the type that, for example, is useable in relation to transmission of a frequency modulated signal.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example, the 720T model manufactured and supplied by TomTom International B.V., provide a reliable means for enabling users to navigate from one position to another. Such devices are of great utility when the user is not familiar with the route to the destination to which they are navigating.

In order to facilitate in-vehicle use of the PND, some PNDs are equipped with a Frequency Modulation (FM) transmitter, for example the 920T model PND available from TomTom International B.V. Instead of amplified audio signals being reproduced by a loudspeaker of the PND, the FM transmitter frequency modulates and transmits the audio signals on a user-selectable frequency. When in a vehicle, a user of the PND tunes an FM radio located in the vehicle to the user-selected frequency so that the FM radio receives the frequency modulated audio signal, demodulates the frequency modulated audio signal and reproduces the audio signal through loudspeakers coupled to the FM radio. Of course, the FM radio can be part of an in-vehicle entertainment system capable of FM reception and including a Compact Disc (CD) multi-changer and other facilities.

It should be noted that it is desirable to use the loudspeakers of in-vehicle entertainment systems via FM transmission for other types of portable device, for example so-called MP3 players and/or mobile telephones. Indeed, it is known for such other portable devices to possess so-called Short-Range Radio (SRR) FM transmitters to transmit audio to FM receivers.

More recently, it has been discovered that advantage can be taken of Radio Data System (RDS) capabilities possessed by many in-vehicle entertainment systems, for example RDS FM radio receivers. On an available channel, a portable device equipped with an RDS encoder transmits, inter alia, a Programme Identification (PI) code, a Programme Service (PS) name (for example, "TomTom") and a list of Alternative Frequencies (AF), the available channel and the list of AFs being selected from free channels detected amongst an FM "landscape" of channels in which the portable device is operating. The formation and transmission of the PI code, the PS name and the list of AFs are in accordance with the RDS technical specification set out by the International Electrotechnical Commission (IEC). The portable device also typically transmits an audio test message on the same available channel.

The user sets an FM radio to scan for the FM transmission from the portable device and identified by the RDS information transmitted by the portable device. When the transmission by the portable device has been found by the FM radio, the frequency modulated audio signal transmitted by the portable device, typically the audio test message, is reproduced by the loudspeakers of the FM radio and a display of the FM radio displays the PS name, namely "TomTom" in this example.

However, in order to operate in accordance with the RDS technical specification, the RDS encoder of the portable device has to transmit, using RDS terminology, a group comprising a unique PI code, which is not in use by regular broadcasters in a geographic area in which the portable device is being operated. If the PI code used is not unique, the FM radio is likely to identify a regular transmitter employing the same PI code instead of the desired SRR FM transmitter of the portable device. In circumstances where the regular transmitter has national coverage, it will be necessary to re-tune the FM radio to the transmission of the portable device on an alternative frequency, but this is likely to be confusing for the average user due to a limited working knowledge of the RDS.

According to the RDS technical specification, the PI code is formed from a series of 4 nibbles, a first nibble comprising a so-called Country Code (CC), a second nibble being used to indicate coverage area of a service, and a third nibble and a fourth nibble are reserved for a programme identification number. As a result of discussions between manufacturers of RDS Integrated Circuits (ICs) and the RDS Forum, it was initially concluded that a PI code should be allocated for use by portable devices, the PI code having a CC of 0 in order to avoid conflicts with other PI codes being used at a national level for radio broadcasts. However, the CC of 0 is excluded by the RDS technical specification and some RDS-equipped receivers may be programmed not to recognise the use of the CC of 0 due to the exclusion. Instead, an alternative proposal is to allow the first nibble of the PI code, i.e. the CC, to be set to a value between 1 and F (hexadecimal), and to set the third and fourth nibbles to 0. The second nibble is set to 0 to 1, depending upon whether or not the SRR transmitter is capable of implementing AFs. In practice, where AFs are contemplated, this structure only accommodates 15 practical codes, namely: 1100, 2100, 3100, 4100, . . . , C100, D100, E100, F100. Assuming that, on average, the FM landscape of channels comprises 3 available FM channels, the likelihood of mutual interference between portable devices is about 17% and interference between SRR transmitters with the same PI code, for example PNDs waiting at traffic lights, is about 1%. Whilst this latter percentage may seem small, it is nevertheless significant. In this respect, in the example of two PNDs waiting at traffic lights, the interference can result in the loudspeaker of an FM radio in one vehicle reproducing audible navigation instructions from another PND located in a neighbouring vehicle. The consequences of such interference can result in substantial inconvenience to the recipient of the wrong navigation instructions. In the more general case of portable devices, interference experienced by a driver from an MP3 player located in a nearby vehicle can be inconvenient and undesirable as it constitutes an unwanted interruption to enjoyment of other media.

SUMMARY OF THE INVENTION

According to a first aspect of the present invention, there is provided a portable navigation device, comprising: a processing resource operably coupled to a Radio Data System communications unit and a location determination unit, the processing resource supporting a country code selector; a data store capable of storing Radio Data System country code data, the data store being operably coupled to the processing resource; wherein the processing resource is arranged to determine a first country associated with location data generated, when in use, by the location determination unit; the country code selector is arranged to identify a first country code from the country code data that does not correspond to the first country associated with the location data and a second country neighbouring the first country; and the processing resource is arranged to use the first country code to generate a Programme Identification code.

The Radio Data System communications unit may transmit the Programme Identification code. The Radio Data System communications unit may be arranged to transmit a group comprising the Programme Identification code. The Radio Data System communications unit may comprise a Radio Data System encoder.

The location data may be present location data.

The Programme Identification code may be associated with a frequency modulated channel for communicating output to a receiver. The device may comprise an audio generation module arranged to generate the output. The output may be based upon a signal that may originate from another device coupled to the navigation device.

The Radio Data System country code data may be arranged to comprise country code neighbour information.

The data store may be capable of storing map data; the processing resource may be arranged to use the location data and the map data in order to identify the second country neighbouring the first country associated with the location data.

The country code selector may be arranged to identify a second country code from the country code data that is associated with the second country and ensure that the first country code is not the second country code.

The processing resource may be arranged to detect when the location determination unit is in the second country; the country code selector may be arranged to identify a third country code from the country code data that does not correspond to the second country and the first country neighbouring the second country with respect to a location of the location determination unit.

The processing resource may be arranged to detect when the location determination unit is approaching a country code boundary; the country code selector may be arranged to identify a third country code from the country code data that does not correspond to the second country and the first country neighbouring the second country with respect to a location of the location determination unit.

The country code selector may be arranged to identify the third country code such that the third country code does not correspond to any other country neighbouring the second country.

The third country code may be different from the second country code.

The processing resource may be arranged to use the third country code to generate another Programme Identification code. The Radio Data System communications unit may be arranged to communicate a relationship between the Programme Identification code and the another Programme Identification code, and to communicate an Alternative Frequency associated with the another Programme Identification code.

The Radio Data System communications unit may communicate the change by transmitting a datagram having a data structure definition associated therewith.

The Radio Data System communications unit may be arranged to communicate a first type of Enhanced Other Networks message to communicate the relationship. The first type of Enhanced Other Networks message is a type 14A group.

The Radio Data System communications unit may be arranged to communicate the relationship between the Programme Identification code and the another Programme Identification code in response to a distance from the country code boundary being less than or equal to a predetermined distance with respect to the country code boundary.

The country code boundary may be a border between the first country and the second country. The processing resource may be arranged to communicate an instruction to re-tune a receiver. The instruction to re-tune the receiver may be an RF communication of an audio message.

The processing resource may be arranged to initiate transmission of the another Programme Identification code following the instruction to re-tune.

The processing resource may be arranged to initiate a change of transmission frequency to the Alternative Frequency and transmission of the Programme Identification code on the Alternative Frequency following communication of the relationship between the Programme Identification code and the another Programme Identification code so as to trigger reception of the another Programme Identification code on the Alternative Frequency associated therewith.

The device may further comprise: an output device operably coupled to the processing resource; wherein the processing resource may be arranged to detect a power-up condition following the communication of the relationship between the Programme Identification code and the another Programme Identification code; and the processing resource may be further arranged to communicate via the output device an instruction to re-tune a receiver.

The output device may be a loudspeaker. The output device may be a display device.

The data store may be arranged to retain map data relating to a first country and a second country; a first Radio Data System technical specification may be associated with the first country and a second Radio Data System technical specification may be associated with the second country; the processing resource may be arranged to identify one of the first country and the second country that corresponds to the location data; and the processing resource may be arranged to generate the Programme Identification code in accordance with one of the first Radio Data System technical specification and the second Radio Data System technical specification depending upon the country identified.

According to a second aspect of the present invention, there is provided a method of generating Radio Data System information in respect of a portable navigation device, the method comprising: generating location data; determining a first country associated with the location data; identifying a first country code that does not correspond to the first country associated with the location data and a second country neighbouring the first country; and using the first country code to generate a Radio Data System Programme Identification code.

The method may further comprise: instructing a user to re-tune a receiver.

According to a third aspect of the present invention, there is provided a method of communicating Radio Data System information in respect of a portable navigation device, the method comprising: a method of generating Radio Data System information as set forth above in relation to the second aspect of the invention; and transmitting the Programme Identification code.

According to an fourth aspect of the present invention, there is provided a computer program element comprising computer program code means to make a computer execute the method as set forth above in relation to the second or third aspects of the invention.

The computer program element may be embodied on a computer readable medium.

It is thus possible to provide a navigation device, an electronic communications apparatus and a method of generating RDS data that employs a Programme Identification code that does not conflict with Programme Identification codes used by regular broadcasters in a geographic area in which the portable device is being operated, for example national and local broadcasters. Additionally, the Programme Identification code generated has a minimised probability of being the same as Programme Identification codes used by other navigation devices and electronic communications apparatus. Furthermore, when the navigation device moves towards or arrives in a new country, the Programme Identification code is changed automatically to avoid conflict of the Programme Identification code with Programme Identification codes used by national and local broadcasters in the new country.

Other advantages of these embodiments are set out hereafter, and further details and features of each of these embodiments are defined in the accompanying dependent claims and elsewhere in the following detailed description.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
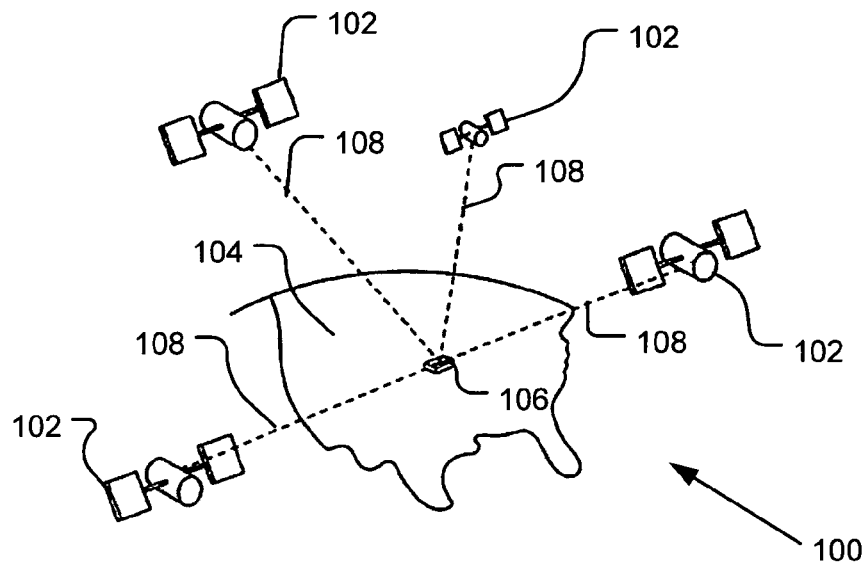
FIG. 1 is a schematic illustration of an exemplary part of a Global Positioning System (GPS) usable by a navigation device.

Throughout the following description identical reference numerals will be used to identify like parts.

A number of embodiments of the present invention will now be described with particular reference to a PND. It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It will also be apparent from the following that the teachings of the present invention even have utility in circumstances, where a user is not seeking instructions on how to navigate from one location to another, but merely wishes to provide audio output to one or more nearby loudspeakers.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 102 are in orbit about the earth 104. The orbit of each satellite 102 is not necessarily synchronous with the orbits of other satellites 102 and, in fact, is likely to be asynchronous. A GPS receiver 106 is shown receiving spread spectrum GPS satellite signals 108 from the various satellites 102.

The spread spectrum signals 108, continuously transmitted from each satellite 102, utilize a highly accurate frequency standard accomplished with an extremely accurate atomic clock. Each satellite 102, as part of its data signal transmission 108, transmits a data stream indicative of that particular satellite 102. It is appreciated by those skilled in the relevant art that the GPS receiver device 106 generally acquires spread spectrum GPS satellite signals 108 from at least three satellites 102 for the GPS receiver device 106 to calculate its two-dimensional position by triangulation. Acquisition of an additional signal, resulting in signals 108 from a total of four satellites 102, permits the GPS receiver device 106 to calculate its three-dimensional position in a known manner.

Figure 2:
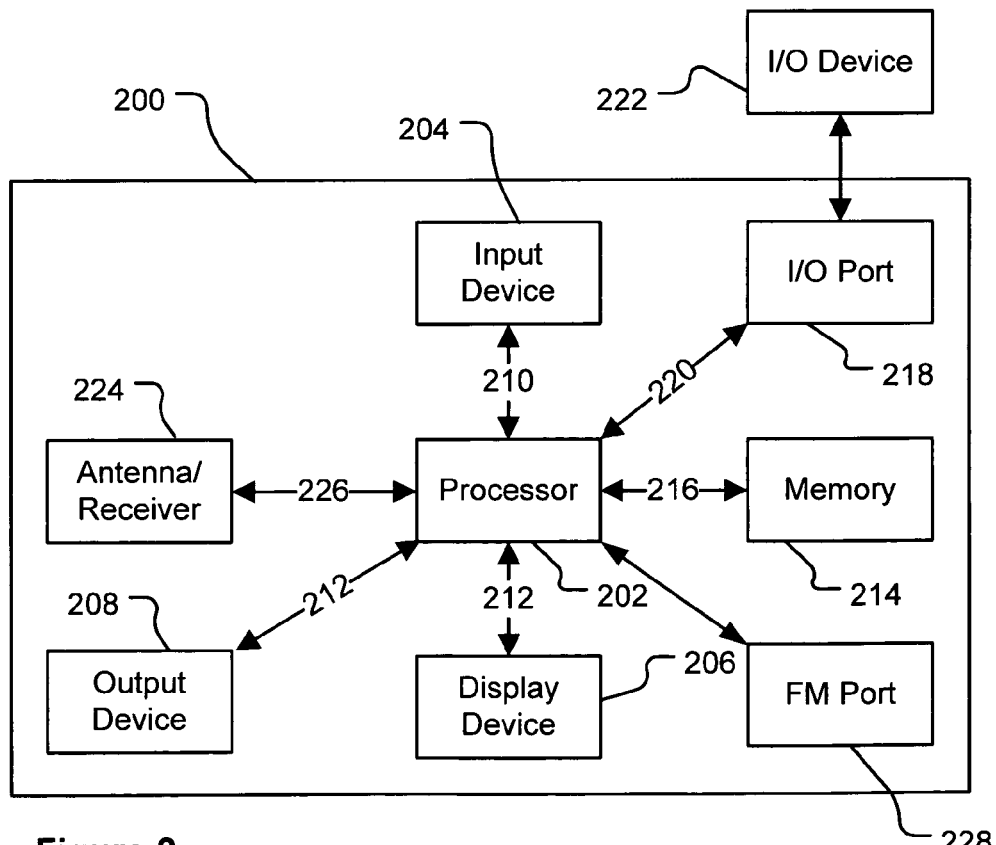
FIG. 2 is a schematic illustration of electronic components of a navigation device constituting an embodiment of the invention.

Referring to FIG. 2, it should be noted that the block diagram of the navigation device 200 is not inclusive of all components of the navigation device, but is only representative of many example components. The navigation device 200 is located within a housing (not shown). The navigation device 200 includes a processing resource comprising, for example, a processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

Figure 6:
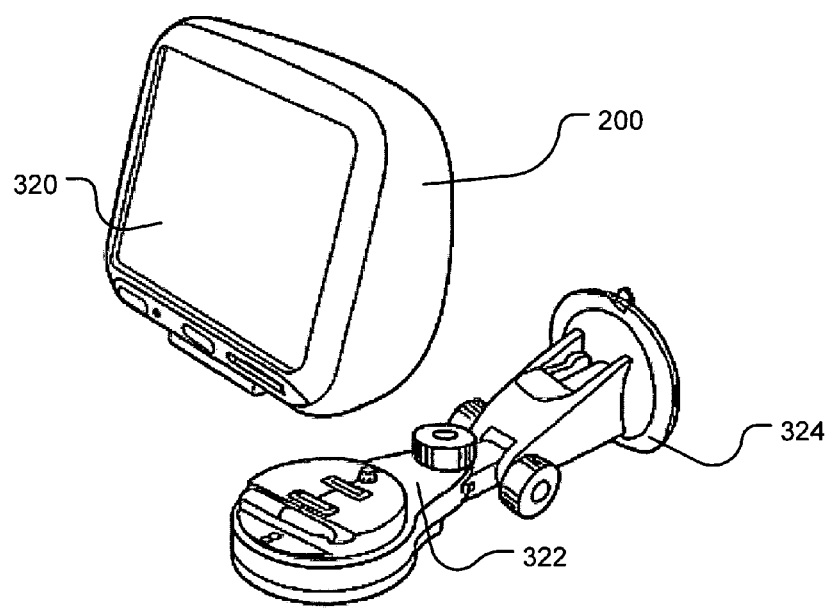
FIG. 6 is a schematic diagram of a docking arrangement for optional use in the vehicle of FIG. 5.

In one arrangement, one aspect of the input device 204, the touch panel, and the display screen 206 are integrated so as to provide an integrated input and display device, including a touchpad or touchscreen input 320 (FIG. 6) to enable both input of information (via direct input, menu selection, etc.) and display of information through a touch panel screen so that a user need only touch a portion of the display screen 320 to select one of a plurality of display choices or to activate one of a plurality of virtual or "soft" buttons. In this respect, the processor 202 supports a Graphical User Interface (GUI) that operates in conjunction with the touchscreen 320.

In the navigation device 200, the processor 202 is operatively connected to and set to receive input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it is should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214, constituting a data store, via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the internet or any other network for example, and/or to establish a connection to a server via the internet or some other network for example.

FIG. 2 further illustrates an operative connection between the processor 202 and an antenna/receiver 224 via connection 226, wherein the antenna/receiver 224 can be a GPS antenna/receiver for example. It will be understood that the antenna and receiver designated by reference numeral 224 are combined schematically for illustration, but that the antenna and receiver may be separately located components, and that the antenna may be a GPS patch antenna or helical antenna for example.

In order to support the functionality described herein, the processor 202 is also coupled to a Frequency Modulation (FM) port 228.

It will, of course, be understood by one of ordinary skill in the art that the electronic components shown in FIG. 2 are powered by one or more power sources (not shown) in a conventional manner. As will be understood by one of ordinary skill in the art, different configurations of the components shown in FIG. 2 are contemplated. For example, the components shown in FIG. 2 may be in communication with one another via wired and/or wireless connections and the like. Thus, the navigation device 200 described herein can be a portable or handheld navigation device 200.

Figure 3:
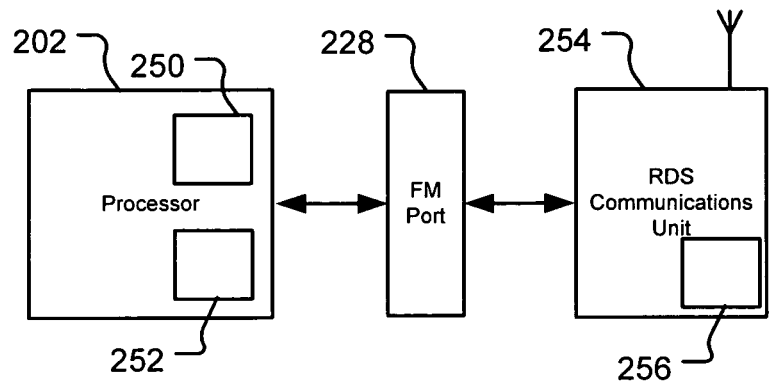
FIG. 3 is a schematic diagram of a part of FIG. 2 coupled to a communications unit.

Turning to FIG. 3, the processor 202 supports a country code selector 250 and a code generator 252. The processor 202 is capable of communicating via the FM port 228 with a Radio Data System (RDS) communications unit 254. The RDS, communications unit 254 comprises an RDS encoder 256 and communications circuitry to transmit both audio and RDS data in accordance with the RDS technical specification, for example as described in the IEC/CENELEC EN 62106 specification for RDS. As RDS communications units are know in the art, further detailed description of the structure of the RDS communications unit 254 will not be provided herein for the sake of clarity and conciseness of description.

Figure 4:
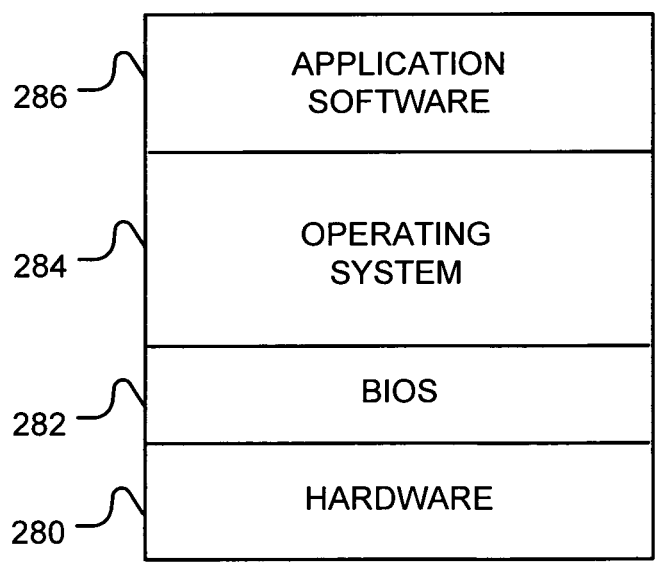
FIG. 4 is a schematic representation of an architectural stack employed by the navigation device.

Referring now to FIG. 4, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the above described route planning and navigation functionality) can run. The application software 286 provides an operational environment including the GUI that supports core functions of the navigation device 200, for example map viewing, route planning, navigation functions and any other functions associated therewith. Map data is stored by the memory 214. Additionally, the memory 214 also stores country code data (not shown), details of which will be described later herein.

Figure 5:
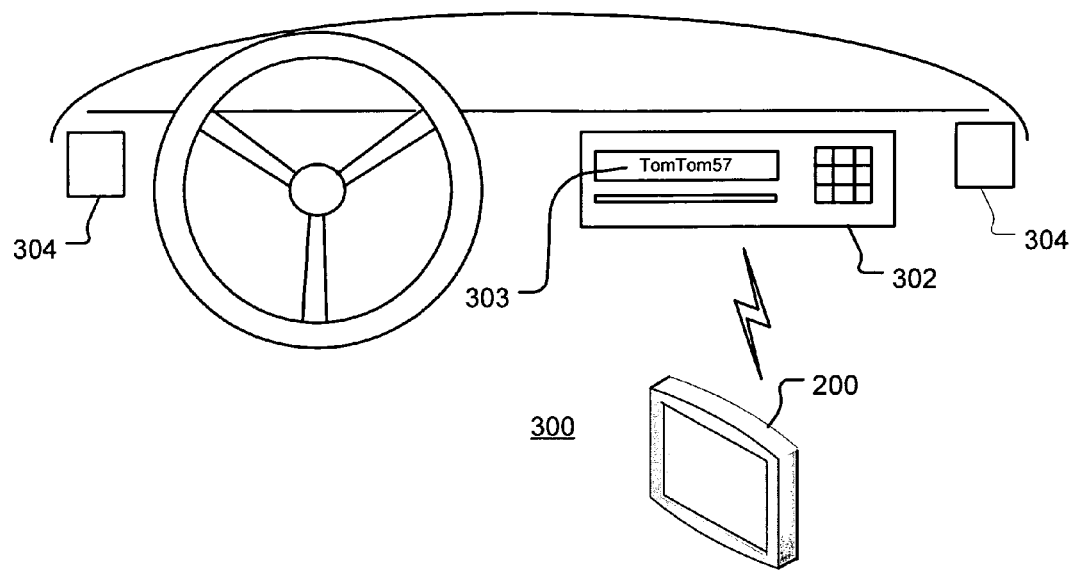
FIG. 5 is a schematic diagram of the navigation device of FIG. 2 in a vehicle.

Referring to FIG. 5, in the following examples, the navigation device 200 is to be used in a vehicle, for example an automobile 300 having an in-vehicle entertainment system, for example an audio entertainment system, such as an FM radio 302 or tuner having a display 303. The FM radio 303 is coupled to a loudspeaker system 304. However, the skilled person should appreciate that the navigation device 200 can be deployed in other environments where an RDS capable FM receiver exists that is coupled to one or more loudspeakers, the use of the loudspeakers being desired. To facilitate use thereof, the portable or handheld navigation device 200 of FIG. 2 can be connected or "docked" in a known manner to the automobile 300, or any other suitable vehicle, for example a bicycle, a motorbike, a car or a boat. The navigation device 200 is then removable from the docked location for portable or handheld navigation use. In this respect (FIG. 6), the navigation device 200 may be a unit that includes the integrated input and display device 320 and the other components of FIG. 2 (including, but not limited to, the internal GPS receiver 224, the microprocessor 202, a power supply (not shown), memory systems 214, etc.).

The navigation device 200 may sit on an arm 322, which itself may be secured to a vehicle dashboard/window/etc. using a suction cup 324. This arm 322 is one example of a docking station to which the navigation device 200 can be docked. The navigation device 200 can be docked or otherwise connected to the arm 322 of the docking station by snap connecting the navigation device 200 to the arm 322 for example. The navigation device 200 may then be rotatable on the arm 322. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 7:
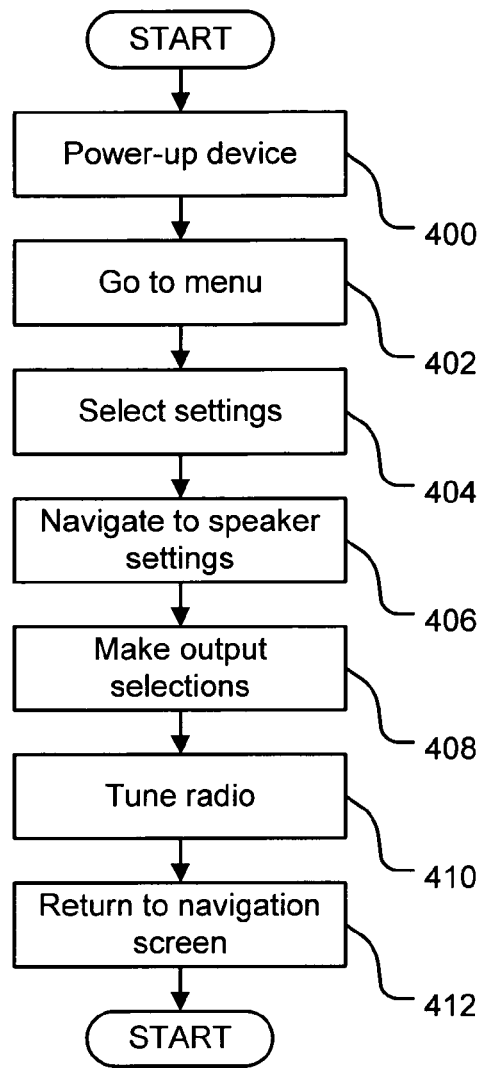
FIG. 7 is a flow diagram of a method of configuring the navigation device of FIG. 2.
Figure 9:
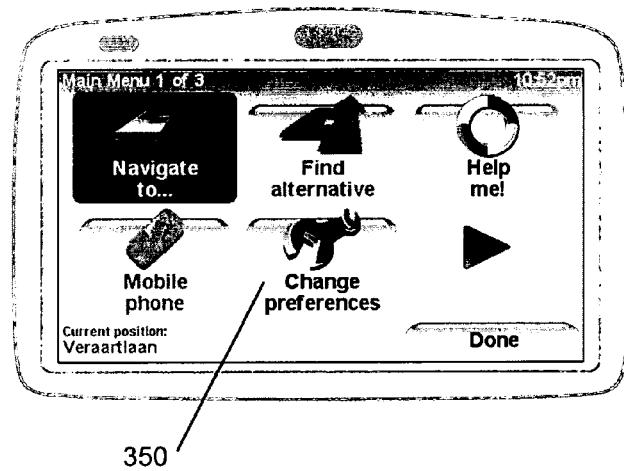
Figure 10:
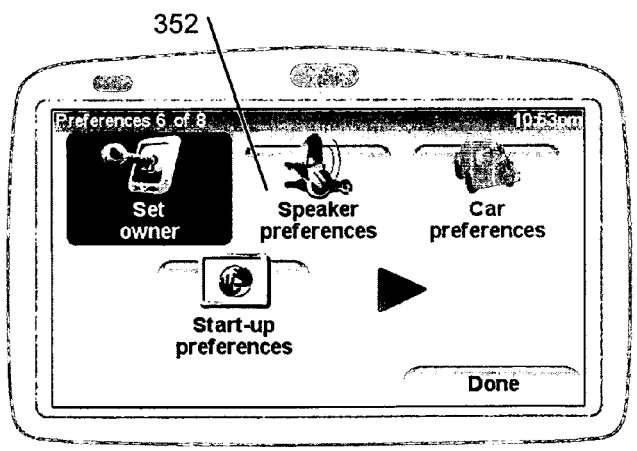
Figure 11:
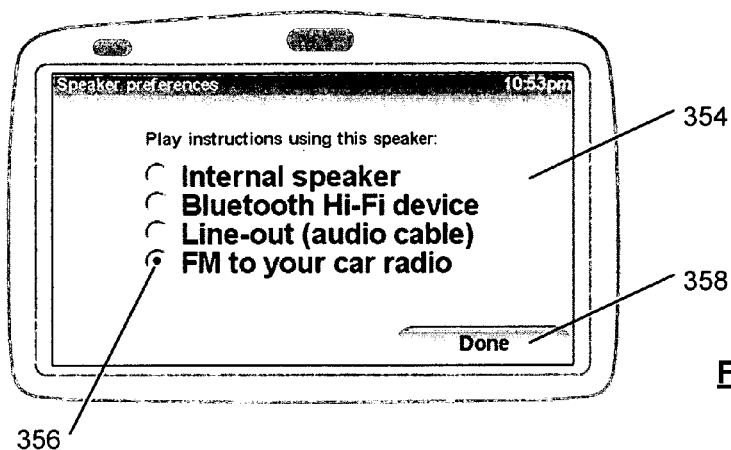
Figure 12:
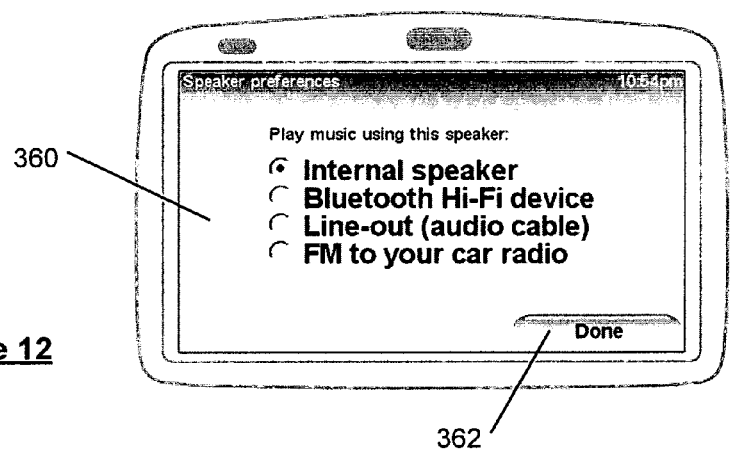
Figure 13:
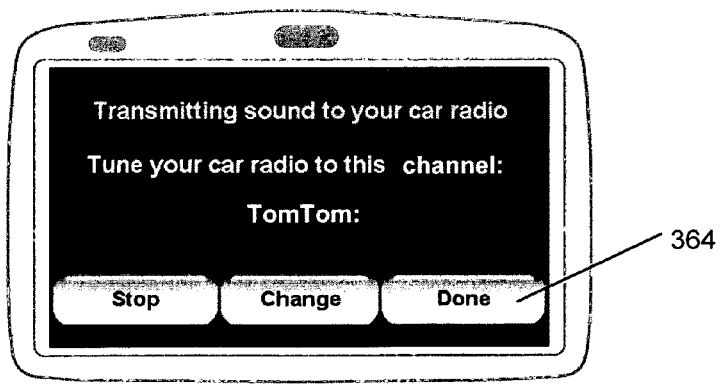

In operation (FIG. 7), a user of the navigation device 200 wishes to driver from the offices of the European Patent Office in The Hague, The Netherlands, to the offices of the Polish Patent Office in Warsaw, Poland. After entering the automobile 300, the user powers-up (Step 400) the navigation device 200 (FIG. 8) and touches the touchscreen display 320 in order to access a menu structure provided by the GUI (Step 402). The user then selects (Step 404) the "Change preferences" menu option 350 (FIG. 9) and then negotiates the menu structure (Step 406) to reach a "Speaker preferences" menu option 352 (FIG. 10). Upon selecting the speaker preferences menu option 352, the GUI displays a first screen of speaker preference options 354 in respect of audible instructions provided by the navigation device 200. In this example, the user wishes the audible instructions to be played through the loudspeaker 304 in the automobile 300 and so selects (Step 408) an "FM to your car radio" option 356. The user then presses a "Done" soft button 358 to indicate that a final selection has been made and the GUI then displays a second screen of speaker preference options 360 (FIG. 12) in respect of music provided by or via the navigation device 200. In this example, it is possible to couple an electronic music player to the navigation device 200 in order to permit play of music through the navigation device 200, either through an internal speaker of the navigation device 200 or another external output device. For the sake of simplicity, this example assumes that no music player or other source of audio signals is coupled to the navigation device 200. However, the skilled person will appreciate that the principles described herein in relation to play of the navigation instructions through the loudspeakers 304 of the FM radio 302 or FM receiver are applicable to the option of use of the loudspeakers 304 in relation to other sources of audio signals. As a consequence of the above assumption, the user does not modify any options presented on the second screen of speaker preference options 360 in respect of music and simply presses another "Done" soft key 362. The GUI then passes to an instruction screen (FIG. 13), which instructs the user to tune the FM radio 302, in present example located in the automobile 300, to a channel identified as "TomTom". The user therefore sets the FM radio 302 to scan for stations (Step 410), RDS capabilities of the FM radio 302 enabling the name of each station detected to be presented by the display 303 of the FM radio 302.

Figure 8:
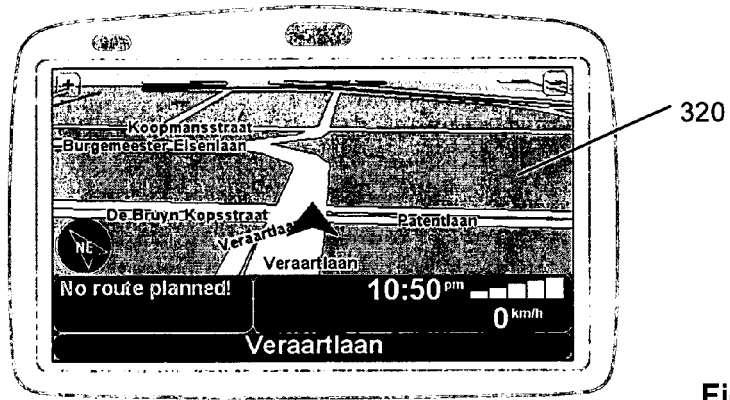
FIGS. 8 to 13 are screen shots from a display of a navigation device following the method of FIG. 7.
Figure 14:
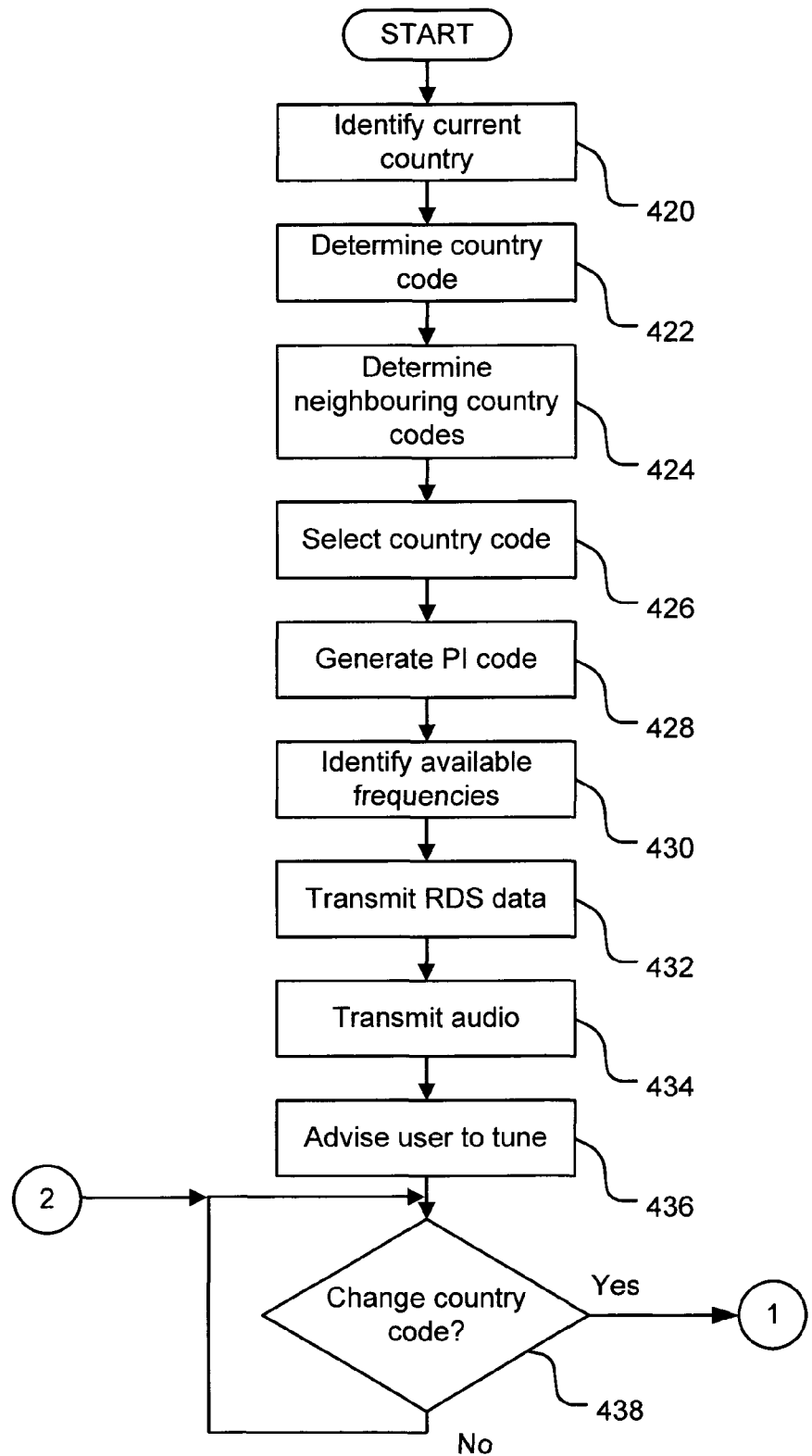
FIG. 14 is a flow diagram of a method of generating RDS data constituting another embodiment of the invention.

Once the FM radio 302 has acquired the "TomTom" broadcast, the user presses a further "Done" soft key 364 and the GUI responds by returning (Step 412) to a map display screen (FIG. 8). In order to support the communication of RDS data from the navigation device 200, the navigation device 200 functions, in this example, as follows (FIG. 14).

The application software 286 of the navigation device 200 determines a current location of the navigation device 200, the navigation device 200 having location determination capabilities as already described above. The location data is used by the processing resource to identify a country to which the location data relates (Step 420). Once identified, the identity of the country is used to by the country code selector 250 to access the country code data mentioned above in order to identify a current RDS country associated with the country identified (Step 422). In this example, the country code data is tabular data comprising country names, respective country codes and country codes of any neighbouring countries. An example of part of the tabular data is shown in Table I below.

TABLE I

| Country | Country code | Neighbours |
|---------|--------------|------------|
| ... | ... | ... |
| NL | 8 | 1, 6, 9, D |
| DE | D, 1, 9 | 2, 3, 4, 6, 7, 8, A |
| ... | ... | ... |

The country code selector 250 also identifies (Step 424), using the country code data, country codes of any countries neighbouring the country associated with the location data (hereinafter referred to as the "current country"). To achieve this, and as mentioned above, the above Table I has been structured, in this example, to list country codes of neighbouring countries. However, the skilled person should appreciate that the data can be organised in a number of different ways, including a simple list of countries and country codes, the determination of neighbouring countries being performed by the navigation device 200 from the map data available and the simplified country code data accessed to obtain associated country codes. Furthermore, the country can be identified in any suitable manner in the country code data, including full country names and/or ISO country codes. Once the country code selector 250 has knowledge of the country codes associated with the current country and countries neighbouring the current country, the country code selector 250 selects (Step 426) a suitable country code to use that does not conflict with the country code associated with the current country or any countries neighbouring the current country.

In respect of the example of a journey from the European Patent Office in The Hague to the Polish Patent Office in Warsaw, the country code for The Netherlands is 8 and the country codes for each neighbouring country with respect to The Netherlands are: 1, 6, 9, D. In this example, the country code selector 250 therefore selects a country code of 2, which does not conflict with any of the above listed country codes for The Netherlands or neighbouring countries.

Thereafter, the PI code generator 252 generates a Programme Identification (PI) code. In this respect, as is known in relation to the RDS, so-called groups are transmitted as part of an RDS data communication process. The RDS data is ultimately transmitted by the RDS communications unit 254, but in order to communicate RDS data, for example, information concerning Alternative Frequencies (AFs) that can be used by the FM radio 302, a block comprising the PI code needs to be included in relevant groups to be transmitted by the RDS communications unit 254. Furthermore, the PI code has to be unique in the sense that it should not conflict with PI codes of other broadcasts, as mentioned previously. Following the scheme for formation of PI codes set out in the RDS technical specification and assuming AFs are to be communicated, the processor 202, through the PI code generator 252, uses the country code selected by the country code selector 250 in order to generate (Step 428) a PI code to be associated with RDS communications from the navigation device 200. As techniques to generate PI codes are known in the art and the selection of country codes is the focus of this example, the actual generation of the PI code to be associated with the navigation device 200 will not, for the sake of clarity and conciseness of description, be described in further detail herein.

The PI code generated is then passed to the RDS communications unit 254 via the FM port 228 for use by the RDS encoder 256.

The RDS communications unit 256 scans allocated spectrum in order to detect available frequencies (Step 430). Thereafter, and using the PI code obtained from the processor 202, the RDS Communications unit 254 transmits (Step 432) appropriate RDS groups for receipt by the FM radio 302, the RDS group comprising AF information. In this respect, RDS data is communicated by the RDS communications unit 254 in a normal manner appropriate for SRRs of this type and so will not be described in further detail herein.

The RDS communications unit 254 also communicates (Step 434) an audio test message, for example, "You have reached your destination" repeatedly and a message is displayed (Step 436 and FIG. 13) by the navigation device 200 to instruct the user to tune the FM radio 302 in order to receive the transmission from the navigation device 200 as described above. The audio test message is cancelled once the user presses the further "Done" soft key 364.

The application software 286 then continues to monitor the location of the navigation device 200 in order to determine whether or not a new PI code needs to be generated (Step 438).

Figure 15:
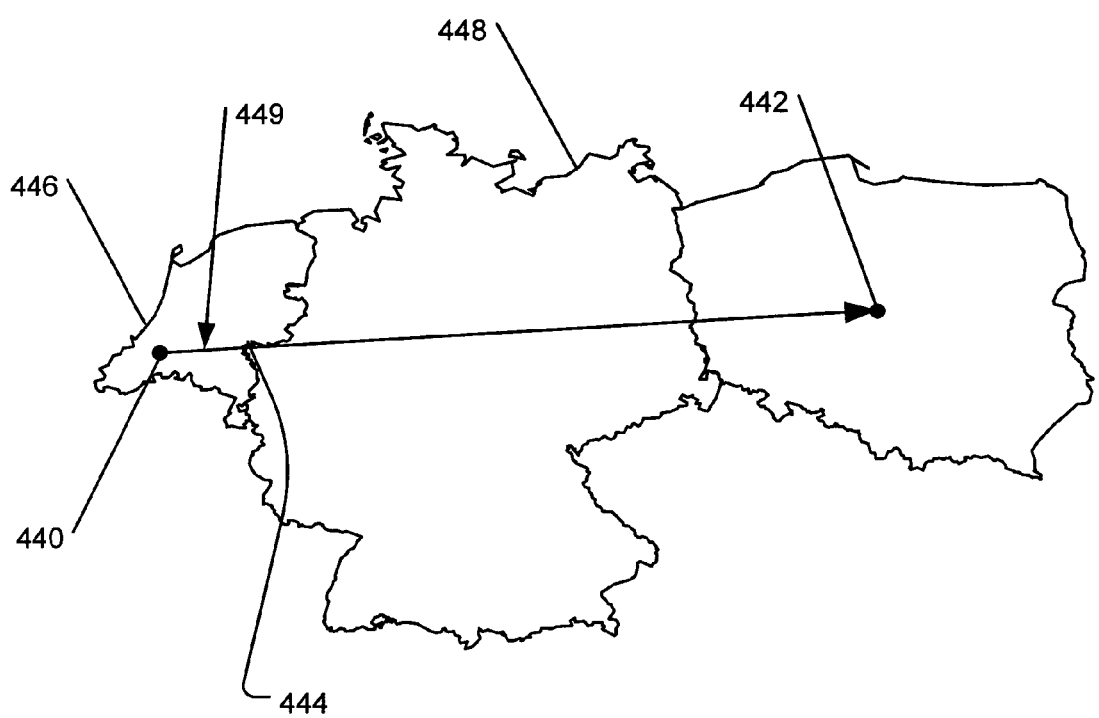
FIG. 15 is a schematic diagram of a map of a route taken by the vehicle of FIG. 5.

Referring to FIG. 15, the navigation device 200, by virtue of its presence in the automobile 300, is travelling from the European Patent Office 440 in The Hague to the Polish Patent Office 442 in Warsaw. En route, the navigation device 200 approaches a border 444, in this example, between The Netherlands 446 and Germany 448. As mentioned above, the application software 286 regularly monitors the location of the navigation device 200 in order to determine, inter alia, whether or not a new PI code needs to be generated (Step 438). In this respect, the application software 286 employs a distance threshold, for example 100 km, as a criterion when determining whether or not a new PI code needs to be generated. From the location data generated by the navigation device 200 and the map data stored in the memory 214, the application software 286 is able to measure the distance that the navigation device 200 is from the border 444.

In this example, once the distance from the border 444 measured is less than or equal to 100 km, the application software 286 determines that the new PI code needs to be generated (Step 438). Alternatively, instead of a distance-based criterion, the application software 286 can decide that the new PI code needs to be generated once the navigation device 200 has crossed the border 444 and is in the neighbouring country, in this example, Germany 448. This determination can be made by the application software 286 using the location data and the map data in order to detect a change of country.

Figure 16:
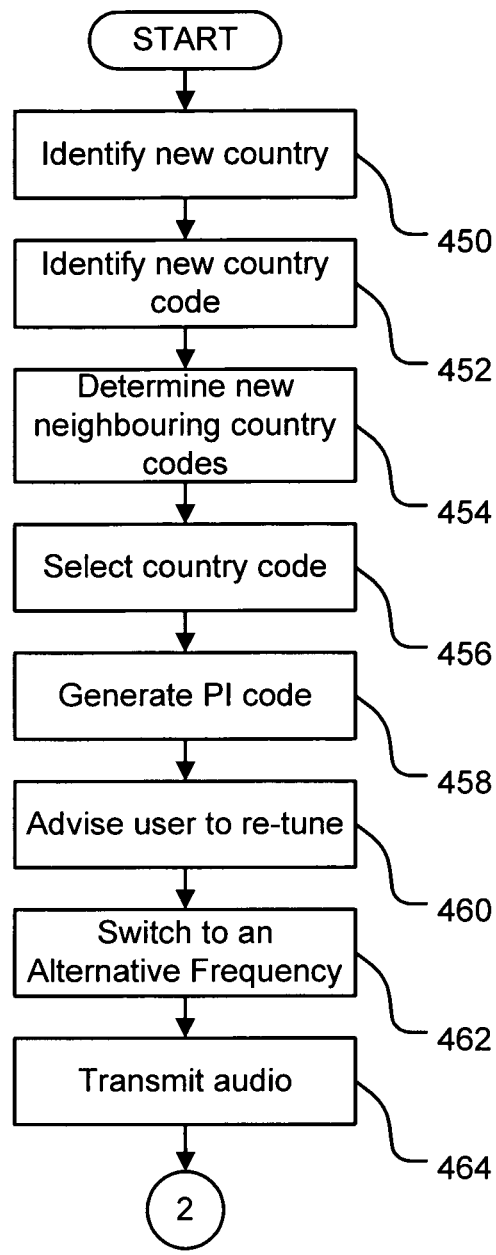
FIG. 16 is a flow diagram of a method of changing transmission frequency and the RDS data generated by the method of FIG. 14 and constituting yet another embodiment of the invention.

In any event, once the application software 286 has decided that the new PI code needs to be generated, the application software 286 identifies (Step 450—FIG. 16) the new country that the navigation device 200 is approaching. The identity of the new country is then used by the country code selector 250 to access the country code data mentioned above in order to identify a new RDS country code associated with the country identified (Step 452). In this respect, the country code data used above is also used to determine the new country code. The country code selector 250 also identifies (Step 454), using the country code data above, country codes of any countries that will neighbour the new country. Once the country code selector 250 has knowledge of the country codes associated with the new country and countries that neighbour the new country, the country code selector 250 selects (Step 456) a suitable country code to use that does not conflict with the country code associated with the new country or any countries neighbouring the new country. In the context of the journey from the European Patent Office in The Hague to the Polish Patent Office in Warsaw, the country codes for Germany are D, 1 and 9 and the country codes for each neighbouring country with respect to Germany are: 2, 3, 4, 6, 7, 8, and A. In this example, the country code selector 250 therefore selects a country code of 5, which does not conflict with any of the above listed country codes for Germany or neighbouring countries. However, other non-conflicting country codes can be selected.

Thereafter, the PI code generator 252 generates the new Programme Identification (PI) code. Again, following the scheme for formation of PI codes set out in the RDS technical specification and assuming AFs are to be communicated, the processor 202 uses the new country code selected by the country code selector 250 in order to generate (Step 458), through the PI code generator 252, the new PI code to be associated with RDS communications from the navigation device 200. As techniques to generate PI codes are known in the art and the selection of country codes is the focus of this example, the actual generation of the new PI code to be associated with the navigation device 200 will not, for the sake of clarity and conciseness of description, be described in further detail herein.

The user is then advised by the navigation device 200, by audible communication, via Radio Frequency (RF) communication, and/or visual communication to re-tune (Step 460) the FM radio 302. In this respect, the application software 286 can wait until a period of time arises when it is known that it will not be necessary to provide navigation instructions to the user and so the user will have time to re-tune the FM radio 302. Optionally, the application software 286 can provide, through the GUI, a soft key to receive confirmation from the user that the FM radio 302 has been set to scan for a new "channel".

Thereafter, the new PI code generated is passed to the RDS communications unit 254 via the FM port 228 for use by the RDS encoder 256 and the processor 202 instructs the RDS communications unit 254 to switch (Step 462) to an Alternative Frequency. The audio test message is then, optionally, transmitted (Step 464) on the Alternative Frequency followed by other audio generated as part of navigation or other functions of the navigation device 200, for example audio pass-through. The application software 286 then returns to monitoring the location of the navigation device 200 in order to determine whether or not a new PI code needs to be generated (Step 438).

Figure 17:
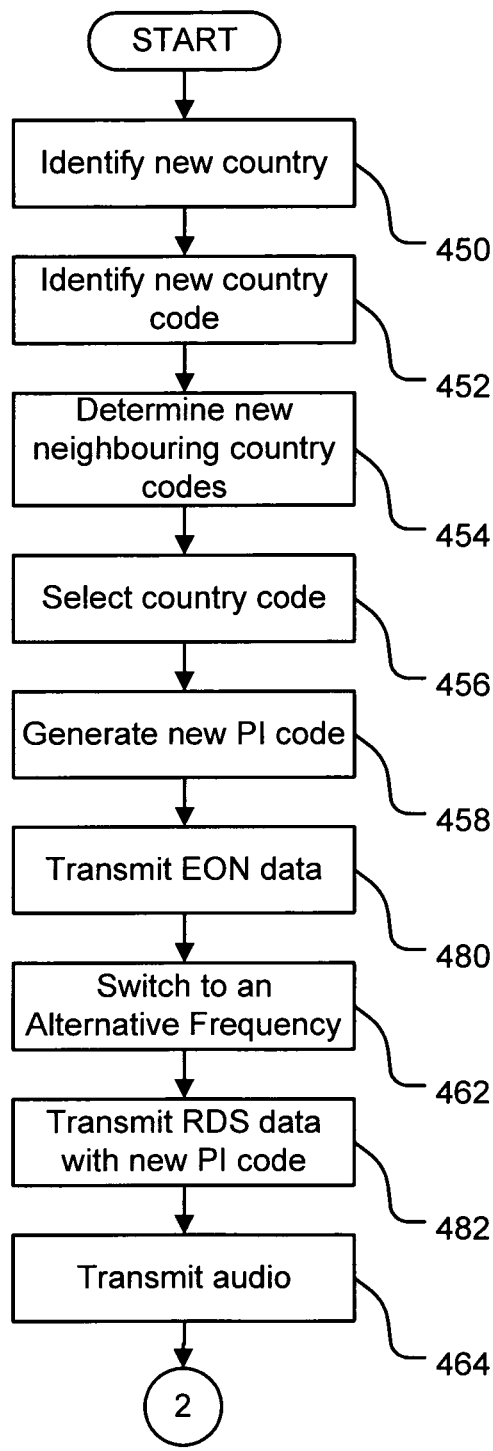
FIG. 17 is a flow diagram of an alternative method of changing the transmission frequency and the RDS data generated by the method of FIG. 14 and constituting a further embodiment of the invention.

As an alternative to automatically instructing the user to re-tune the FM radio 302, the follows alternative procedure (FIG. 17) can be implemented by the navigation device 200. In this respect, once the application software 286 has decided that the new PI code needs to be generated, the application software 286 identifies (Step 450—FIG. 16) the new country that the navigation device 200 is approaching. The identity of the new country is then used by the country code selector 250 to access the country code data mentioned above in order to identify a new RDS country code associated with the country identified (Step 452). In this respect, the country code data used above is also used to determine the new country code. The country code selector 250 also identifies (Step 454), using the country code data above, country codes of any countries that will neighbour the new country. Once the country code selector 250 has knowledge of the country codes associated with the new country and countries that neighbour the new country, the country code selector 250 selects (Step 456) a suitable country code to use that does not conflict with the country code associated with the new country or any countries neighbouring the new country. In the context of the journey from the European Patent Office in The Hague to the Polish Patent Office in Warsaw, the country codes for Germany are D, 1 and 9 and the country codes for each neighbouring country with respect to Germany are: 2, 3, 4, 6, 7, 8, and A. In this example, the country code selector 250 therefore selects a country code of 5, which does not conflict with any of the above listed country codes for Germany or neighbouring countries.

Thereafter, the PI code generator 252 generates the new Programme Identification (PI) code. Again, following the scheme for formation of PI codes set out in the RDS technical specification and assuming AFs are to be communicated, the processor 202 uses the new country code selected by the country code selector 250 in order to generate (Step 458) the new PI code to be associated with RDS communications from the navigation device 200. As techniques to generate PI codes are known in the art and the selection of country codes is the focus of this example, the actual generation of the new PI code to be associated with the navigation device 200 will not, for the sake of clarity and conciseness of description, be described in further detail herein.

The new PI code is then passed to the RDS communications unit 254 along with an Alternative Frequency and the RDS communications unit 254 generates and transmits (Step 480) an Enhanced Other Networks (EON) message, for example a type 14A group, the EON message providing the FM radio 302 with the new PI code and the Alternative Frequency for future use. The EON message therefore effectively serves to communicate an association or relationship between the current PI code and the new PI code. The processor 202 then instructs the RDS communications unit 254 to switch (Step 462) to the Alternative Frequency and the RDS communications unit 254 then transmits (Step 482) RDS groups using the new PI code on the Alternative Frequency, all further audio also being transmitted (Step 464) on the Alternative Frequency. The application software 286 then returns to monitoring the location of the navigation device 200 in order to determine whether or not a new PI code needs to be generated (Step 438).

Once the navigation device 200 starts to transmit RDS data on the Alternative Frequency and hence ceases to transmit data on the previous frequency, the loss of signal triggers the FM radio 302 to reacquire the "channel" and so, in accordance with normal operation of FM tuners, the FM radio 302 accesses local memory (not shown) in order to obtain on Alternative Frequency therefrom along with the associated new PI code. The FM radio 302 therefore automatically re-tunes to the Alternation Frequency and expects to receive groups comprising the new PI code.

The above examples are useful in respect of the, predominantly European, RDS. However, as the skilled person will appreciate, a different technical specification is implemented in North America, for example in the United States of America, known as the Radio Broadcast Data System (RBDS). The RBDS employs a different methodology for the generation of PI codes to that described above in aspect of the preceding examples. Consequently, the methodology for generating PI codes proposed by the RDS Forum as described above can be employed, or any other suitable alternative technique.

Therefore, in another embodiment, the navigation device 200 is capable of generating PI codes in a manner compatible with the RDS technical specification and the RBDS technical specification described in the embodiments above. The navigation device 200 therefore uses the location data and the map data to identify the country in which the navigation device 200 is currently located and hence use the method of generating PI codes appropriate to the country in which the navigation device 200 is located.

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, it should be noted that although the RDS communications unit 254 described herein is internal to the navigation device 200, the FM port 228 can be provided for coupling an external RDS communications unit to the navigation device 200 or any other suitable portable electronic apparatus.

As another example, whilst embodiments described in the foregoing detailed description refer to GPS, it should be noted that the navigation device may utilise any kind of position sensing technology as an alternative to (or indeed in addition to) the GPS. For example the navigation device may utilise other global navigation satellite systems (GNSS) such as the proposed European Galileo system when available. Equally, it is not limited to satellite based but could readily function using ground based beacons or any other kind of system that enables the device to determine its geographic location, for example the long range navigation (LORAN)-C system.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A portable navigation device, comprising:
a processing resource operably coupled to a Radio Data System communications unit and a location determination unit, the processing resource supporting a country code selector;
a data store capable of storing Radio Data System country code data, the data store being operably coupled to the processing resource; wherein the processing resource is arranged to determine a first country associated with location data generated, when in use, by the location determination unit; the country code selector is arranged to identify a first country code from the country code data that does not correspond to the first country associated with the location data and a second country neighbouring the first country; and the processing resource is arranged to use the first country code to generate a Programme Identification code.

2. A device as claimed in claim 1, wherein the Radio Data System country code data is arranged to comprise country code neighbour information.

3. A device as claimed in claim 1, wherein the data store is capable of storing map data, the processing resource being arranged to use the location data and the map data in order to identify the second country neighbouring the first country associated with the location data.

4. A device as claimed in claim 3, wherein the country code selector is arranged to identify a second country code from the country code data that is associated with the second country and ensure that the first country code is not the second country code.

5. A device as claimed in claim 1, wherein the processing resource is arranged to detect when the location determination unit is in the second country, the country code selector being arranged to identify a third country code from the country code data that does not correspond to the second country and the first country neighbouring the second country with respect to a location of the location determination unit.

6. A device as claimed in claim 1, wherein the processing resource is arranged to detect when the location determination unit is approaching a country code boundary, the country code selector being arranged to identify a third country code from the country code data that does not correspond to the second country and the first country neighbouring the second country with respect to a location of the location determination unit.

7. A device as claimed in claim 5, wherein the country code selector is arranged to identify the third country code such that the third country code does not correspond to any other country neighbouring the second country.

8. A device as claimed in claim 5, wherein the third country code is different from the second country code.

9. A device as claimed in claim 6, wherein the processing resource is arranged to use the third country code to generate another Programme Identification code.

10. A device as claimed in claim 9, wherein the Radio Data System communications unit is arranged to communicate a relationship between the Programme Identification code and the another Programme Identification code and to communicate an Alternative Frequency associated with the another Programme Identification code.

11. A device as claimed in claim 10, wherein the Radio Data System communications unit is arranged to communicate a first type of Enhanced Other Networks message to communicate the relationship.

12. A device as claimed in claim 10, wherein the Radio Data System communications unit is arranged to communicate the relationship between the Programme Identification code and the another Programme Identification code in response to a distance from the country code boundary being less than or equal to a predetermined distance with respect to the country code boundary.

13. A device as claimed in claim 12, wherein the country code boundary is a border between the first country and the second country.

14. A device as claimed in claim 9, wherein the processing resource is arranged to communicate an instruction to re-tune a receiver.

15. A device as claimed in claim 14, wherein the instruction to re-tune the receiver is an RF communication of an audio message.

16. A device as claimed in claim 14, wherein the processing resource is arranged to initiate a change of transmission frequency to an Alternative Frequency and transmission of the another Programme Identification code on the Alternative Frequency following the instruction to re-tune.

17. A device as claimed in claim 10, wherein the processing resource is arranged to initiate a change of transmission frequency to the Alternative Frequency and transmission of the Programme Identification code on the Alternative Frequency following communication of the relationship between the Programme Identification code and the another Programme Identification code so as to trigger reception of the another Programme Identification code on the Alternative Frequency associated therewith.

18. A device as claimed in claim 1, wherein: the data store is arranged to retain map data relating to a first country and a second country, a first Radio Data System technical specification being associated with the first country and a second Radio Data System technical specification being associated with the second country; the processing resource is arranged to identify one of the first country and the second country that corresponds to the location data; and the processing resource is arranged to generate the Programme Identification code in accordance with one of the first Radio Data System technical specification and the second Radio Data System technical specification depending upon the country identified.

19. A computer-implemented method of generating Radio Data System information in respect of a portable navigation device, the method comprising:
   generating location data;
   using a processing resource to determine a first country associated with the location data;
   using a processing resource to identify a first country code that does not correspond to the first country associated with the location data and a second country neighbouring the first country; and
   wherein the processing resource uses the first country code to generate a Radio Data System Programme Identification code and communicate output to a receiver using the Programme Identification code.

20. A method as claimed in claim 19, further comprising: instructing a user to tune a receiver.

21. A method of communicating Radio Data System information in respect of a portable navigation device, the method comprising: a method of generating Radio Data System information as claimed in claim 19; and transmitting the Programme Identification code.

22. A non-transitory computer program element comprising computer program code segments to make a computer execute the method as claimed in claim 19.

23. A non-transitory computer program element as claimed in claim 22, embodied on a computer readable medium.

24. A device as claimed in claim 5, wherein the processing resource is arranged to use the third country code to generate another Programme Identification code.

25. A device as claimed in claim 6, wherein the country code boundary is a border between the first country and the second country.

* * * * *